US009086609B1

(12) United States Patent
Yan et al.

(10) Patent No.: US 9,086,609 B1
(45) Date of Patent: Jul. 21, 2015

(54) MIRRORLESS-OSCILLATION IN A WAVEGUIDE USING NON-DEGENERATE FOUR-WAVE MIXING

(71) Applicant: University of Southern California, Los Angeles, CA (US)

(72) Inventors: Yan Yan, Los Angeles, CA (US); Lin Zhang, Los Angeles, CA (US); Alan E. Willner, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 196 days.

(21) Appl. No.: 13/869,730

(22) Filed: Apr. 24, 2013

Related U.S. Application Data

(60) Provisional application No. 61/637,997, filed on Apr. 25, 2012.

(51) Int. Cl.
*G02F 1/39* (2006.01)
(52) U.S. Cl.
CPC . *G02F 1/395* (2013.01); *G02F 1/39* (2013.01)
(58) Field of Classification Search
CPC .... G02F 1/39; G02F 1/395; G02F 2001/3542
USPC .............. 359/326–332; 372/21–22
See application file for complete search history.

(56) References Cited

U.S. PATENT DOCUMENTS

| | | | | |
|---|---|---|---|---|
| 5,195,104 A * | 3/1993 | Geiger et al. | ................. | 372/97 |
| 6,801,356 B2 * | 10/2004 | Broderick et al. | ............ | 359/332 |
| 7,123,792 B1 * | 10/2006 | Mears et al. | ................. | 385/37 |
| 8,331,017 B2 * | 12/2012 | Suchowski et al. | ........... | 359/326 |
| 8,970,944 B2 * | 3/2015 | Chuu et al. | .................... | 359/330 |
| 2014/0016933 A1 * | 1/2014 | Copner et al. | ................. | 398/48 |

OTHER PUBLICATIONS

Afshar et al., "A full vectorial model for pulse propagation in emerging waveguides with subwavelength structures part I: Kerr nonlinearity", Optics Express vol. 17, No. 4, Feb. 16, 2009, pp. 2298-2318.
Bian et al., "Phase conjugation by low-power continuous-wave degenerate four-wave mixing in nonlinear optical polymer fibers", Applied Physics Letters, vol. 84, No. 6, Feb. 9, 2004, pp. 858-860.

(Continued)

*Primary Examiner* — Daniel Petkovsek
(74) *Attorney, Agent, or Firm* — Fish & Richardson P.C.

(57) ABSTRACT

Nondegenerate mirrorless four-wave mixing oscillation with frequency tunability is proposed in nonlinear waveguide of the third-order nonlinearity such as silicon waveguide) by using two different spatial modes. As low as ~2 W threshold power is obtained in several centimeters long waveguide. In one aspect, a method includes propagating a first wave along an axis of a multimode waveguide in a forward direction, the first optical wave having a first frequency; propagating a second wave along the axis of the multimode waveguide in a backward direction, the second wave having a second frequency; the waveguide configured to support multiple modes, including at least a fundamental mode and a second mode; and the propagating the first wave occurs at a same time as the propagating the second wave to generate a third wave in the forward direction having a third frequency and fourth wave in the backward direction having a fourth frequency.

7 Claims, 4 Drawing Sheets

(56) References Cited

OTHER PUBLICATIONS

Bloom et al., "Observation of amplified reflection by degenerate four-wave mixing in atomic sodium vapor", Optics Letters, vol. 2, No. 3, Mar. 1978, pp. 58-60.
Bristow et al., "Two-photon absorption and Kerr coefficients of silicon for 850-2200 nm", Applied Physics Letters 90, 191104, 2007, 4 pages.
Canalias et al., "Mirrorless optical parametric oscillator", Nature Photonics, vol. 1, Aug. 2007, pp. 459-462.
Ja, "Energy transfer between two beams in writing a reflection volume hologram in a dynamic medium", Optical and Quantum Electronics 14, May 17, 1982, pp. 547-556.
Lin et al., "Dispersion of silicon nonlinearities in the near infrared region", Applied Physics Letters 91, 021111, Jul. 12, 2007, 3 pages.
Lin et al., "Nonlinear optical phenomena in silicon waveguides: Modeling and applications", Optics Express, vol. 15, No. 25, Dec. 10, 2007, pp. 16604-16644.
Picozzi et al., "Incoherent Solitons in Instantaneous Response Nonlinear Media", Physical Review Letters, vol. 92, No. 14, Apr. 9, 2004, 4 pages.
Pitois et al., "Polarization and modal attractors in conservative counterpropagating four-wave interaction", Europhysics Letters, 70 (1), Apr. 1, 2005, pp. 88-94.
Rukhlenko et al., "Nonlinear Silicon Photonics: Analytical Tools", IEEE Journal of Selected Topics in Quantum Electronics, vol. 16, No. 1, Jan./Feb. 2010, pp. 200-215.
Stolen, "Phase-Matched-Stimulated Four-Photon Mixing in Silica-Fiber Waveguides", IEEE Journal of Quantum Electronics, vol. QE11, Nol. 3, Mar. 1975, pp. 100-103.
Yan et al., "Nondegenerate mirrorless oscillation in silicon waveguide", Optics Letters, vol. 36, No. 20, Oct. 15, 2011, pp. 4113-4115.
Yariv et al., "Amplified reflection, phase conjugation, and oscillation in degenerate four-wave mixing", Optics Letters, vol. 1, No. 1, Jul. 1997, pp. 16-18.
Agrawal, "Four-Wave Mixing", Nonlinear Fiber Optics, Fourth Edition, 2007, Ch. 10, pp. 368-423.
Zibrov et al., "Nondegenerate Parametric Self-Oscillation via Multiwave Mixing in Coherent Atomic Media", The American Physical Society, Physical Review Letters, vol. 83, No. 20, Nov. 15, 1999, pp. 4049-4052.

\* cited by examiner

MIRRORLESS-OSCILLATION IN A WAVEGUIDE USING NON-DEGENERATE FOUR-WAVE MIXING

CROSS-REFERENCE TO RELATED APPLICATIONS

This application claims the benefit under 35 U.S.C. §119 (e) of U.S. Patent Application No. 61/637,997, filed Apr. 25, 2012, and entitled "Mirrorless-Oscillation In A Waveguide Using Non-degenerate Four-Wave Mixing".

STATEMENT AS TO FEDERALLY SPONSORED RESEARCH

This invention was made with government support under Grant No. HR0011-09-C-0124 by the Defense Advanced Research Projects Agency (DARPA). The government has certain rights in the invention.

BACKGROUND

This disclosure relates to optical oscillators. Optical parametric oscillators are an important optical source. In general, in the material with second or third nonlinear nonlinearity, the energy of pump light would be transferred to newly generated light with new frequency. The traditional optical parametric oscillator is based on forward (co-propagating) parametric process, such as forward difference frequency generation (DFG) and forward sum frequency generation (SFG) in material of second-order optical nonlinearity, and forward four-wave mixing (FWM) in material of the third-order optical nonlinearity. An optical parametric oscillator using forward parametric process requires cavity structure, such as mirror, Bragg grating and ring resonator, to provide resonance for oscillation. Mirrorless oscillation using backward DFG in a crystal with second-order nonlinearity has been demonstrated (see C. Canalias and V. Pasiskevicius, Nature Photonics 459-462 (2007)).

One prominent optical nonlinearity is FWM in nonlinear material of third-order nonlinearity, which has been investigated when the four optical waves co-propagate, Most FWM optical parametric oscillators are based on forward nonlinear parametric process in nonlinear crystal and waveguide. Mirrorless non-degenerate mirrorless optical parametric oscillator using backward (or counter-propagating) FWM process has been only demonstrated in atom system as nonlinear material.

SUMMARY

This disclosure describes systems and techniques for FWM mirrorless oscillation using a waveguide of the third-order nonlinearity. Backward (counter-propagating) FWM requires a precise control of a phase matching condition. Therefore, counter-propagating FWM and resultant mirrorless oscillation usually occur for four degenerate frequencies, white non-degenerate FWM oscillation is only observed by using atomic coherence effect, Counter-propagating FWM of the present disclosure enables additional functions such as high-efficiency energy exchange and mirrorless.

An optical parametric oscillator can be based on backward (counter-propagating) nonlinear parametric process and does not need a cavity structure for resonation. An optical parametric oscillator using backward nonlinear parametric process is also mirrorless or cavity-free optical parametric oscillator. We invent a mirrorless (cavity-free) optical parametric oscillator using non-degenerate four-wave mixing nonlinear process in nonlinear waveguide. A key technology is that we use backward non-degenerate four-wave mixing between two different spatial modes in the waveguides to generate light with new frequency. The invented technology can be used as light source for optical fiber system and on-chip integrated optical system.

Optical nonlinearities can enable many different types of high-speed and phase-transparent functions, including wavelength conversion, signal processing and parametric oscillation. For on-chip applications, a desirable goal would be to achieve highly efficient non-degenerate FWM mirrorless oscillation in planar waveguide structures, in which newly generated frequencies have a wide tunable spectral range.

We describe on-chip non-degenerate mirrorless FWM oscillation in silicon waveguide. The phase matching condition is satisfied between two different spatial modes. All four frequencies are different, and the newly generated frequency can be tuned by up to 0.7 THz with a pump frequency change of 5 THz, Around the wavelength of 2300 nm, the threshold power for mirrorless oscillation is estimated to be 1.84~3 W with a conversion efficiency of 14.5~17% which is achieved in the symmetric pump configuration using centimeter-long multimode silicon waveguides. The optimized waveguide length is also shown to achieve the lowest threshold power.

A mirrorless optical parametric oscillator using four-wave mixing in nonlinear waveguide (e.g., mirrorless oscillator based on non-degenerate backward four-wave mixing in nonlinear waveguide) would be compatible with optical fiber (and other nonlinear waveguides) communication systems and on-chip integrated systems, and potentially has much higher conversion efficiency than optical parametric oscillator based on forward parametric process. The mirrorless oscillator can have a simpler structure without cavity. Without wavelength selection condition induced by the cavity, the mirrorless optical parametric oscillator can have better wavelength tunability.

An aspect of the subject matter described in this specification can be embodied in a mirrorless oscillator including: a waveguide having an X-axis, a Y-axis, and a Z-axis, wherein the X-axis, Y-axis and Z-axis have dimensions large enough for the waveguide to support multiple spatial modes, including at least a fundamental mode and a second mode; a first pump configured to pump a first wave at a first frequency through the waveguide along a forward direction of the Z-axis; a second pump configured to pump a second optical wave at a second frequency through the waveguide along a backward direction of the Z-axis; and the waveguide configured to generate two other waves along the Z-axis, one along the forward direction and one along the backward direction, the two other waves having third and fourth frequencies. Other embodiments of this aspect include corresponding systems and apparatus. For example, a system can include an optical fiber, and the mirrorless oscillator coupled with the optical fiber.

These and other embodiments can optionally include one or more of the following features. The first frequency, $f_1$, the second frequency, $f_2$, the third frequency, $f_3$, and the fourth frequency $f_4$ can have a frequency relationship of: $f_1+f_2=f_3+f_4$. The waveguide can include a silicon nonlinear waveguide of several centimeters in length. Further, a system can include an on-chip integrated system including the mirrorless oscillator.

Another aspect of the subject matter described in this specification can be embodied in one or more methods that include: propagating a first wave along an axis of a multimode waveguide in a forward direction, the first optical wave having a first frequency; propagating a second wave along the axis of the multimode waveguide in a backward direction, the second wave having a second frequency; the waveguide configured to support multiple modes, including at least a fundamental mode and a second mode; and the propagating the first wave occurs at a same time as the propagating the second wave to generate a third wave in the forward direction having a third frequency and fourth wave in the backward direction having a fourth frequency. Other embodiments of this aspect include corresponding systems and apparatus, such as noted above.

Details of one or more implementations are set forth in the accompanying drawings and the description below, Other features, aspects, and potential advantages will be apparent from the description and drawings, and from the claims.

BRIEF DESCRIPTION OF TUE DRAWINGS

Figure 1A:
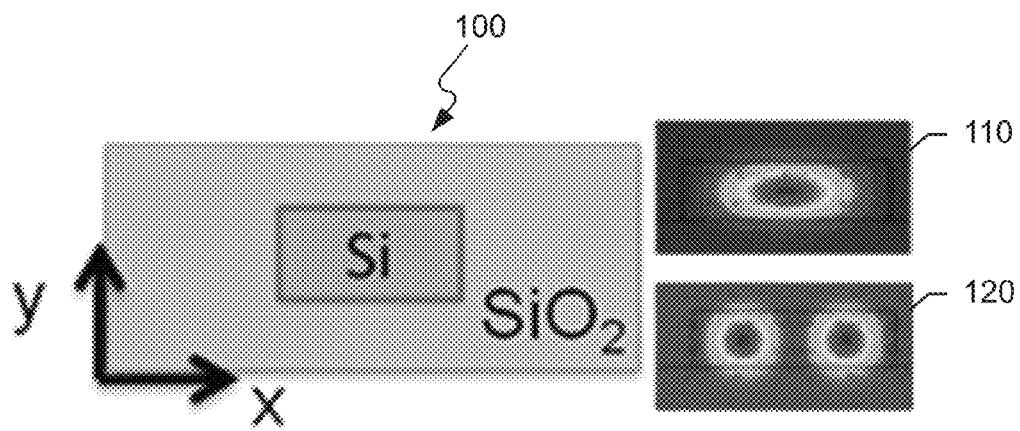
FIG. 1A shows a cross section of a nonlinear waveguide.
Figure 1B:
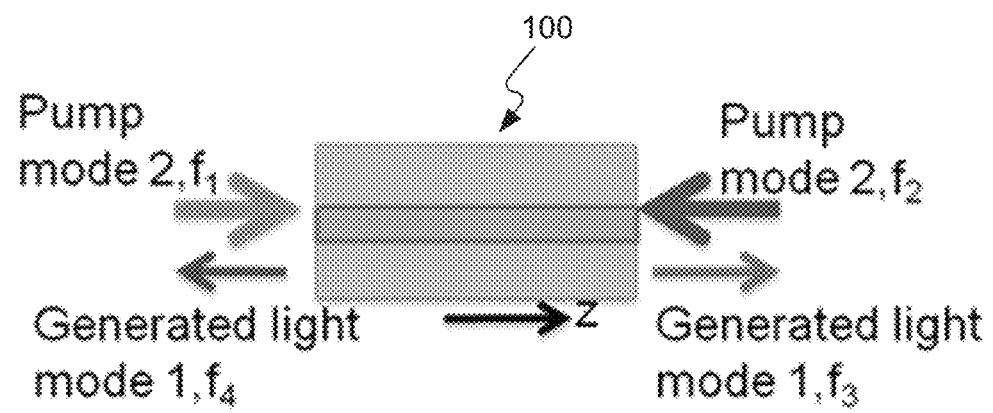
FIG. 1B shows non-degenerate backward four-wave mixing in the nonlinear waveguide of FIG. 1A.
Figure 1C:
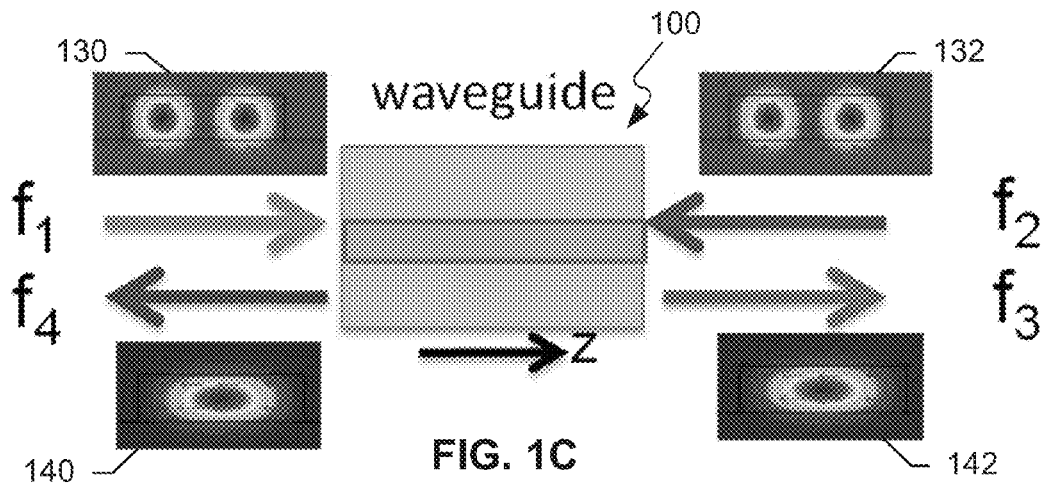

FIG. 1C also shows the concept of mirrorless oscillation by counter-propagating FWM between a fundamental mode (mode 1) and a second mode (mode 2) in the nonlinear, multimode waveguide of FIG. 1A.

Figure 2:
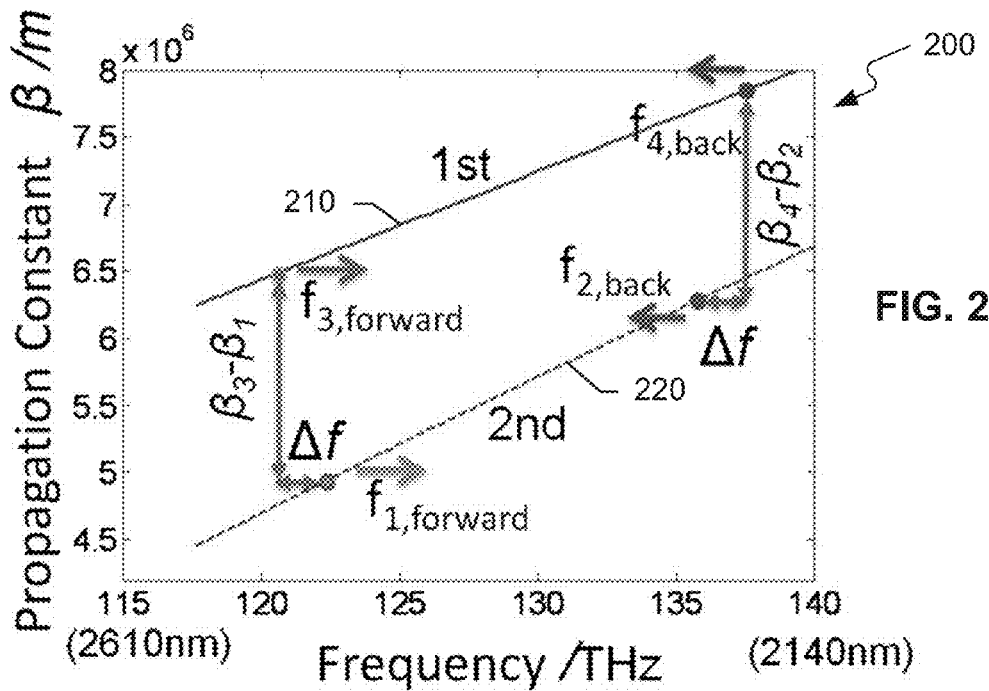

FIG. 2 shows a graph of the propagation constant $\beta$ of fundamental mode ($1^{st}$ mode) and the second mode ($2^{nd}$ mode) as a function of the frequency and oscillation waves' f-$\beta$ relation.

Figure 3:
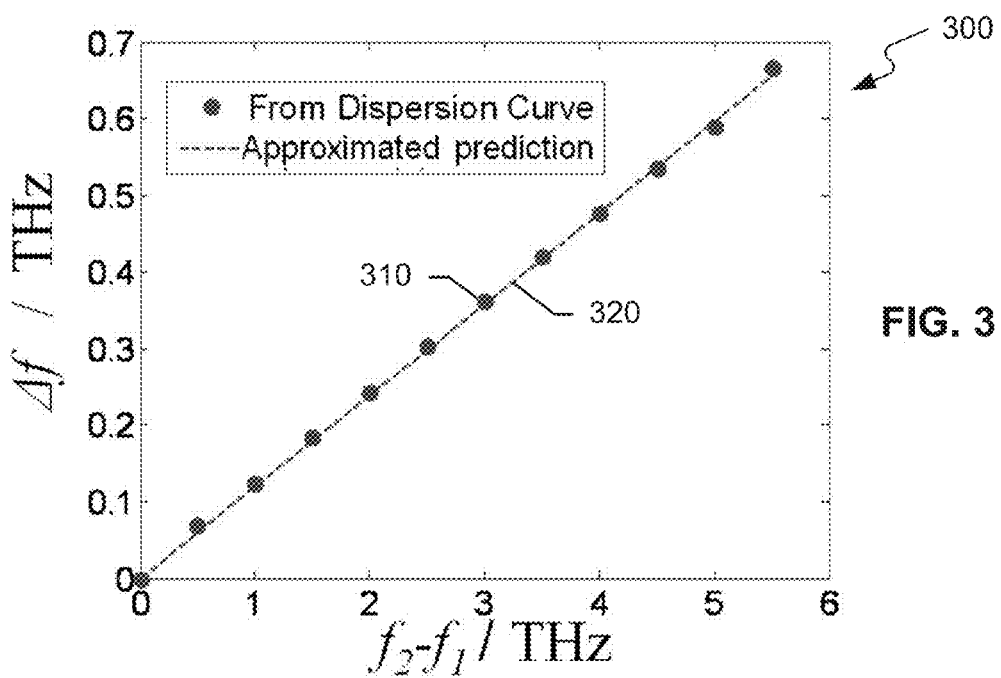

FIG. 3 shows a graph of the generated frequency difference $\Delta f$ from the input pump light as a function of $f_2$-$f_1$.

Figure 4:
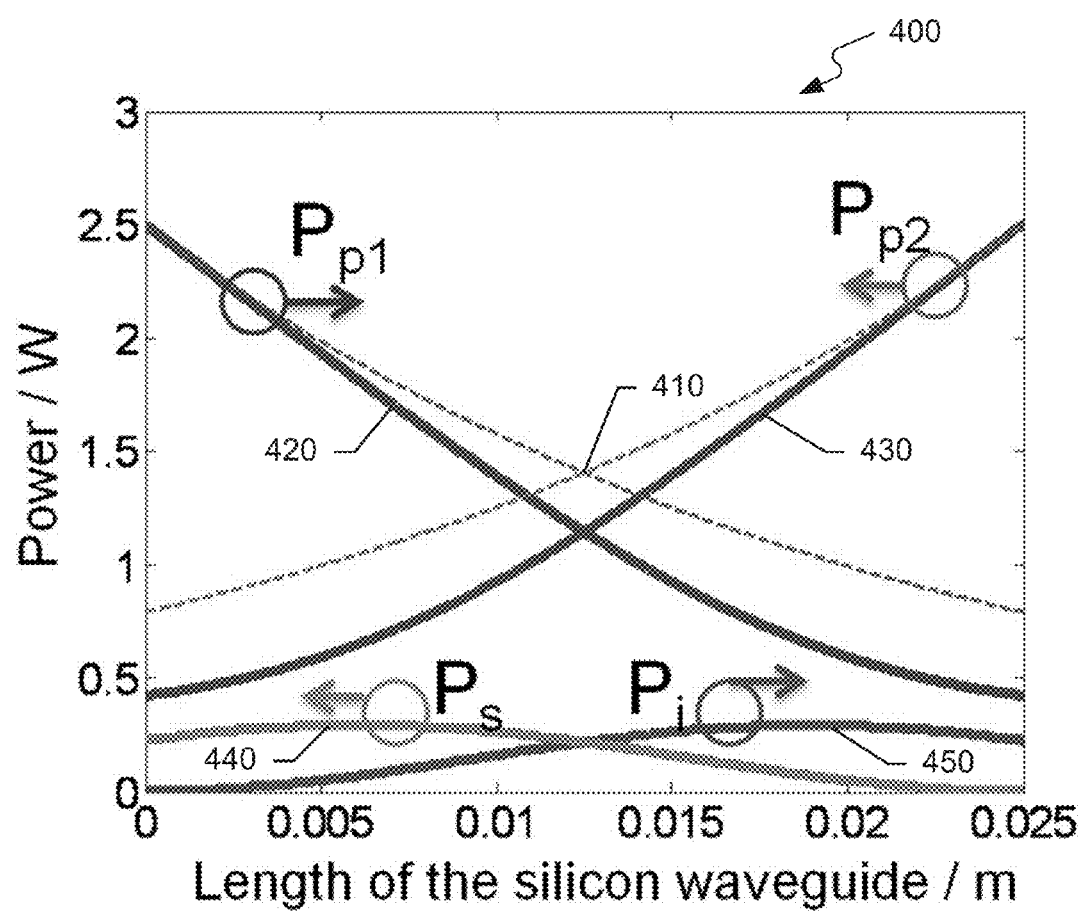

FIG. 4 shows a graph of optical power distributions in mirrorless oscillators along the z axis of the nonlinear waveguide.

Figure 5:
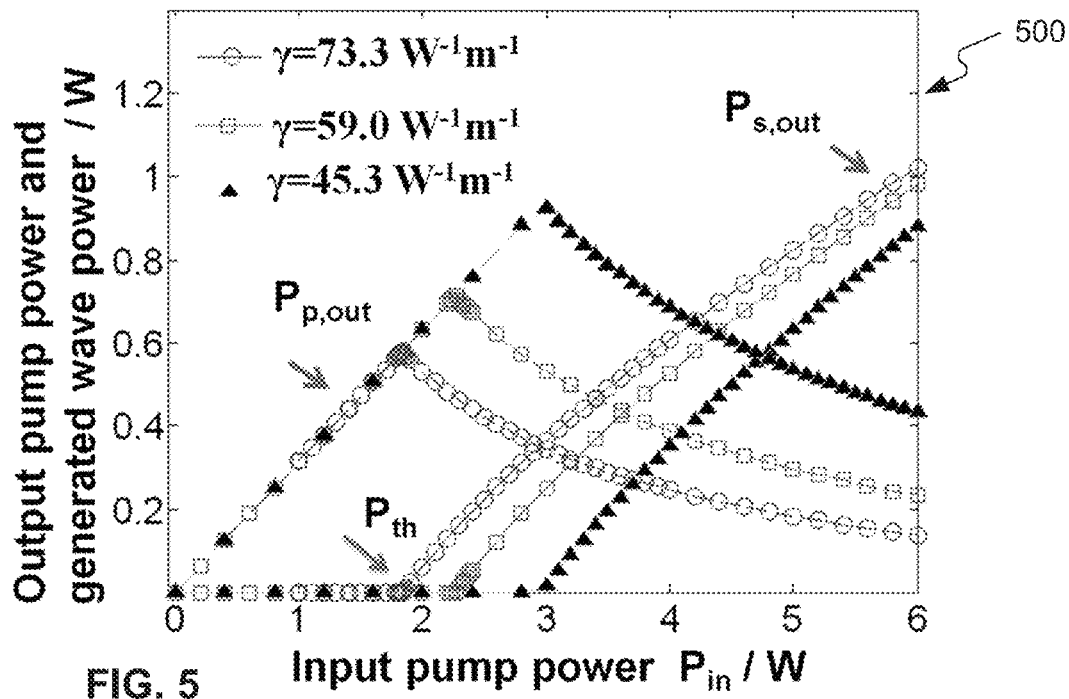

FIG. 5 shows a graph of output pump ($P_{p,out}$) and generated wave power ($P_{s,out}$) as a function of input pump power.

Figure 6:
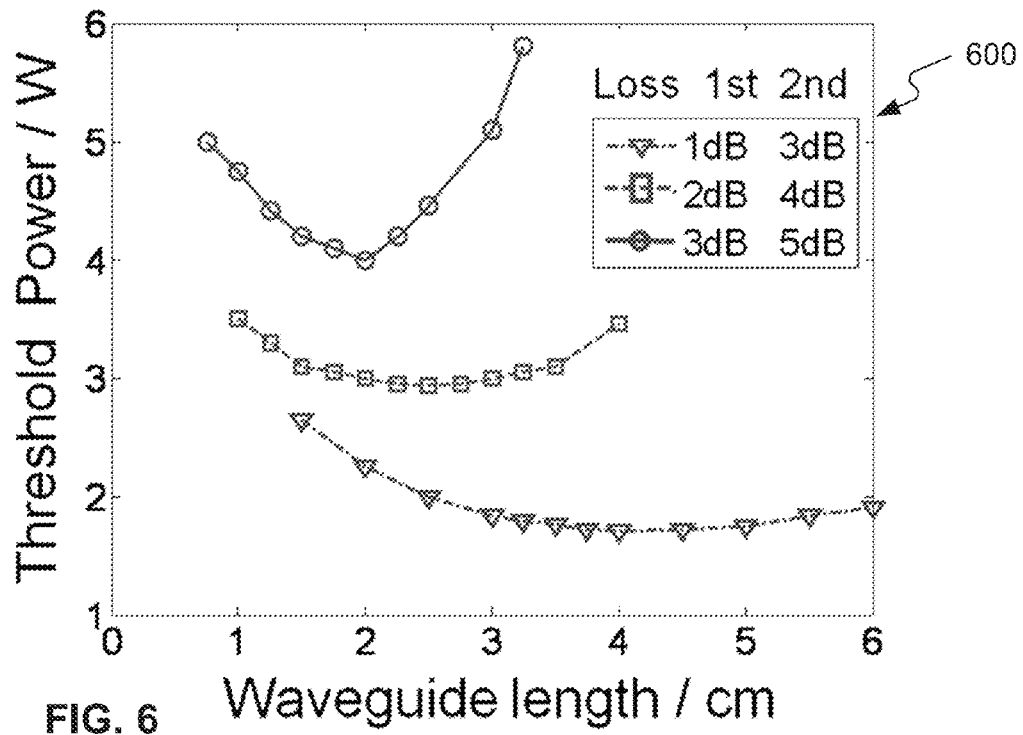

FIG. 6 shows a graph of threshold input pump power as function of silicon waveguide length under different loss assumptions.

DETAILED DESCRIPTION

A mirrorless oscillator using backward non-degenerate four-wave mixing in nonlinear waveguide is described in connection with FIGS. 1A-1C. FIG. 1A shows a cross section of a nonlinear waveguide, A silicon (Si) waveguide 100 on a silicon dioxide ($SiO_2$) substrate can support a first mode 110 (e.g., fundamental TE mode) and a second mode 120 (e.g., second-order TE mode). In FIG. IA, the intensity distribution of the two spatial modes 110, 120 in the waveguide 100 is shown. In general, the waveguide is designed to support at least two different eigenmodes. The fundamental mode and the second mode are two different eigenmodes of the waveguide, which means the second mode either has different transverse intensity distribution or different polarization state from the fundamental mode.

FIG. 1B shows in the backward of the four-wave mixing process, two pump light at frequencies $f_1$ and $f_2$ of mode 2 counter-propagating in the waveguide 100, and generating two other waves at frequencies $f_3$ and $f_4$ of mode 1. The frequency relationship is $f_1+f_2=f_3+f_4$. Input pumps are counter-propagating light of mode 2 would generate counter-propagating light of model. Also, two counter-propagating pump light at frequencies $f_3$ and $f_4$ of model can generate light at frequencies of $f_3$ and $f_4$ of mode 2. The frequency of each wave is different from others, Thus, the concept of the mirrorless optical parametric oscillation using non-degenerate four-wave mixing between two different spatial modes in a nonlinear waveguide is shown.

FIG. 1C also shows the concept of mirrorless oscillation by counter-propagating FWM between a fundamental spatial mode and a second spatial mode in the nonlinear, multimode waveguide 100. An intensity distribution $E_1$ 130 is for the forward light of the second mode, an intensity distribution $E_2$ 132 is for the backward light of the second mode, an intensity distribution $E_3$ 142 is for the forward fundamental mode, and an intensity distribution $E_4$ 140 is for the backward fundamental mode.

For example, a mirrorless oscillator can be implemented using the multimode waveguide 100, in which two light sources provide pump light at frequencies $f_1$ and $f_2$, respectively. Two circulators can be used to input the pump light from the two light sources into the waveguide 100, and collect the generated light of frequencies $f_3$ and $f_4$. Thus, as is apparent from FIG. 1C, a first circulator on a first side can input light at frequency $f_1$ and collect generated light at frequency $f_4$ for output, and a second circulator on a second side can input light at frequency $f_2$ and collect generated light at frequency $f_3$ for output.

Different spatial waveguide modes have been used to fulfill phase-match in co-propagating FWM (see H. Stolen, IEEE Journal of Quantum Electronics 11, 100-103 (1975)), Here we use them to achieve phase matching in counter-propagating FWM in a multimode silicon waveguide 100. Two pumps at frequencies $f_1$ and $f_2$ in a second mode (e.g., second-order mode) counter-propagate in the waveguide and then generate two other waves at frequencies $f_3$ and $f_4$ in the fundamental (first) mode by FWM with frequency relation $f_1+f_2=f_3+f_4$. In a simulation, the core size of the silicon waveguide 100 on a silicon dioxide ($SiO_2$) substrate was 1200×340 $nm^2$, which can support two different spatial modes, which are fundamental and second-order quasi-TE (x polarization) modes over a wavelength range from 2200 to 2500 nm. The phase matching condition is $$(\beta_3+\beta_4)-(\beta_1+\beta_2)=(|\beta_3|-|\beta_1|)-(|\beta_4|-|\beta_2|)=0 \quad (1)$$

where $\beta_{1,2,3,4}$ are the waves' propagation constants and here $\beta_1,\beta_3 \leq 0$ and $\beta_2,\beta_4 \leq 0$.

FIG. 2 shows a graph 200 of the propagation constant $\beta$ of fundamental mode and second-order mode as a function of the frequency f and oscillation waves' f-$\beta$ relation, $\Delta f = f_1 - f_3 = f_4 - f_2$, calculated using a finite-element mode solver, COMSOL. The dispersion curves can be approximated as two tines with different slope. For any two points $(f_1,\beta_1)$, $(f_2,\beta_2)$ on one curve, there are two and only two other points $(f_3,\beta_3)$, $(f_4, \beta_1)$ on the other curve that fulfill the frequency condition and phase matching condition in Eq. (1), which means non-degenerate FWM mirrorless oscillation can automatically satisfy the required phase matching condition in FWM with no need of any phase-matching technique. With line approximation of the dispersion curves, the frequency relation of the four waves is $(f_4-f_3)/(f_2-f_1)=a_2 a_1$ or $\Delta f/(f_2-f_1)=(a_2-a_1)/a_1$, in which $\Delta f=f_1-f_3$ and $a_1, a_2$ are the slope of the approximated line for the fundamental mode and 2nd-order mode, respectively.

The line 210 is the propagation constant $\beta$ of mode 1 as a function of the frequency f, and the line 220 is the propagation constant $\beta$ of mode 2 as a function of the frequency f. The arrows indicate the propagation directions of the lights. Thus, the frequency and propagation constant relationship of the light in counter-propagating four-wave mixing, and the frequency and phase-matching condition in backward four-wave mixing in a nonlinear waveguide, are shown.

FIG. 3 shows a graph 300 of the generated frequency shift Δf as a function of $f_2-f_1$. Define $\Delta f=f_1-f_3=f_4-f_2$ as the frequency difference of newly generated light and pump light. $(f_2-f_1)$ is the frequency difference between the light of two pumps. The dots 310 are a result calculated from the f–β curve from FIG. 2. The dashed line 320 is a prediction based on the slope of approximated lines. The frequency tunability of the generated light can be achieved by changing the input pump wavelength. Because of the feature of cavity-free and self-phase matching, the frequency tunability would be potentially better than forward optical parametric oscillator.

FIG. 3 shows the frequency difference between the generated light and pump light Δf changes with $(f_2-f_1)$ when the $f_2$ is fixed, e.g., at 127.5 THz (2350 nm). The dots 310 are calculated from the exact dispersion curve, and the dashed line 320 is the result of the line approximation slope $a_2=9.9783\times10^4$/m/THz and $a_1=8.050\times10^4$/m/THz. The frequency tunability $\Delta f/(f_2-f_1)$ for mirrorless oscillator in this waveguide is 11.9%, which shows the potential application of wavelength converter, and parametric oscillator. The tune range could be enhanced by further design of the waveguide dispersion to increase $a_2/a_1$.

The structure of the nonlinear waveguide in this technology can support two spatial modes with a large effective refractive index difference between them as shown in FIG. 2. Any possible waveguide design with two or more materials with highly refractive index contrast can be used as the structure for a mirrorless optical parametric oscillator, such as strip waveguide, ridge waveguide, circular or elliptical shape fiber, waveguide with periodic structure, or photonic crystal waveguide.

FWM mirrorless oscillation is investigated when the input counter-propagating pump waves are continuous wave with equal power. The pumps mode are the fundamental mode, and the generated waves are the 2nd-order mode. Because the oscillation threshold power highly depends on the loss, the wavelengths of the four waves are chosen around 2300 nm (Pumps: fundamental mode, $\lambda_1=2254$ nm, $\lambda_2=2364$ nm, generated wave: second-order mode, $\lambda_3=2264$ nm, $\lambda_4=2355$ nm) to avoid the nonlinear loss caused by two photon absorption (TPA) effect (TPA can be neglected when λ>2200 nm; see Al. D. Bristow, N. Rotenberg, and H. M. Driel, Appl. Phys. Lett. 90, 191104 (2007)). The nonlinear coefficient γ is calculated by full vectorial modal (see A. V. Shahraam, and T. M. Monro, Optics Express 17, 2298-2318 (2009)). Due to the measurement uncertainty of the Kerr nonlinearity $n_2$ (see Al. D. Bristow, N. Rotenberg, and H. M. Driel, Appl, Phys, Lett. 90, 191104 (2007) and Q. Lin, J. Zhang, G. Piredda, R, W. Boyed, P. Fauchet, and G. P. Agrawal, Appl. Phys. Lett. 90, 021111 (2007)), the calculated γ of the 2300 nm is 45.3~73 $W^{-1}$ $m^{-1}$. The overlap coefficient η (see Q. Lin, O. J. Painter, and G. P. Agrawal, Optics Express 15, 16604-16644 (2007)) of fundamental and 2nd-order is 0.66. The linear propagation loss of the fundamental mode and 2nd-order mode in silicon waveguide are first assumed as 2 dB/cm and 4 dB/cm, respectively. By numerically solving the backward FWM coupled equations which is similar in G. P. Agrawal, Nonlinear Fiber Optics, Chapter 10, the power distribution along the waveguide can be obtained.

FIG. 4 shows a graph 400 of optical power distributions in mirrorless oscillators. Solid lines 420, 430 are power distributions of two counter-propagating pumps $(P_{p1}, P_{p2})$, and tines 440, 450 are the generated counter-propagating waves $(P_s, P_i)$ in a mirrorless oscillator as a function of nonlinear waveguide length. The dash line 410 is the pump power only with linear loss. The arrows indicate the propagation direction of the waves.

The input counter-propagating pump light with different frequency of one mode are continuous wave with equal power. When the input pump power is above the threshold power, the mirrorless oscillation occurs and two generated counter-propagating light of another mode with power $P_i$ and $P_s$ grow from zero input. The energy is transferred from the pump to the generated light with new frequencies. As shown in FIG. 4 (waveguide length $l_0=2.5$ cm, $\gamma=73$ $W^{-1}$ $m^{-1}$), when the input pump power is above the threshold power the mirrorless oscillation occurs. The generated waves' power $P_i$ and $P_s$ grow from zero input and the energy is transferred from the pump to the generated waves.

FIG. 5 shows a graph 500 of output pump $P_{p,out}$ and generated wave power $P_{s,out}$ as a function of input pump power $P_{p,in}$ with three different nonlinear coefficients. The abrupt tuning points on the curves indicate the input threshold power $P_{th}$. When the input pump power increases beyond the threshold power, $P_{s,out}$ starts to increase and $P_{2,out}$ decreases as input power increases, $P_{th}$ for three γ values in FIG. 5 are 1.84 W, 2.26 W and 3 W respectively. The conversion efficiency can reach 14.5-17% when input power is 6 W.

FIG. 6 shows a graph 600 of threshold input power $P_{th}$ as function of silicon waveguide length under different loss assumptions when $\gamma=45.3$ $W^{-1}$ $m^{-1}$. For any given loss parameter, there is an optimized waveguide length $L_{opt}$ that can minimize the threshold power. For higher linear loss, $L_{opt}$ becomes shorter and $P_{th}$ is more sensitive to the waveguide length changes. This is readily understood because in the counter-propagating FWM oscillation with linear loss, the effective coupling constant κ[1] should be $[P_{2in}\exp(-\alpha l) P_{1in}\exp(-\alpha(l_0-l))]^{0.5}l_0 = P_{1in}\exp(-\alpha l_0/2)l_0$, in which $l_0$ is the waveguide length and α is the loss.

The materials for mirrorless optical parametric oscillators built in accordance with the above descriptions can be existing waveguide material with third order nonlinearity, such as III-V compound semiconductor (e.g., InP, GaAs, InGaAsP), based material (e.g., silicon-on-insulator, silicon nitride), silica-on-silicon, artificial photonic crystals (e.g., air-hole-based or rod-based), and polymer (e.g., SU8). Moreover, mirrorless oscillator using backward non-degenerate four-wave mixing can be applied to a light source for fiber systems and on-chip integrated systems.

A number of implementations have been described. Nevertheless, it will be understood that various modifications may be made. In addition, other steps may be provided, or steps may be eliminated, from the described flows, and other components may be added to, or removed from, the described systems. Accordingly, other implementations are within the scope of the following claims.

What is claimed is:
1. A mirrorless oscillator comprising:
   a waveguide having an X-axis, a Y-axis, and a Z-axis, wherein the X-axis, Y-axis and Z-axis have dimensions large enough for the waveguide to support multiple spatial modes, including at least a fundamental mode and a second mode;
   a first pump configured to pump a first wave at a first frequency through the waveguide along a forward direction of the Z-axis;
   a second pump configured to pump a second optical wave at a second frequency through the waveguide along a backward direction of the Z-axis; and
   the waveguide configured to generate two other waves along the Z-axis, one along the forward direction and one along the backward direction, the two other waves having third and fourth frequencies.

2. The mirrorless oscillator of claim 1, wherein the first frequency, $f_1$, the second frequency, $f_2$, the third frequency, $f_3$, and the fourth frequency $f_4$ have a frequency relationship of:

$$f_1+f_2=f_3+f_4.$$

3. The mirrorless oscillator of claim 2, wherein the waveguide comprises a silicon nonlinear waveguide between one and five centimeters in length.

4. A system comprising:
an optical fiber; and
a mirrorless oscillator coupled with the optical fiber, the mirrorless oscillator comprising a waveguide having an X-axis, a Y-axis, and a Z-axis, wherein the X-axis, Y-axis and Z-axis have dimensions large enough for the waveguide to support multiple spatial modes, including at least a fundamental mode and a second mode; a first pump configured to pump a first wave at a first frequency through the waveguide along a forward direction of the Z-axis; a second pump configured to pump a second optical wave at a second frequency through the waveguide along a backward direction of the Z-axis; and the waveguide configured to generate two other waves along the Z-axis, one along the forward direction and one along the backward direction, the two other waves having third and fourth frequencies.

5. The system of claim 4, wherein the first frequency, $f_1$, the second frequency, $f_2$, the third frequency, $f_3$, and the fourth frequency, $f_4$ have a frequency relationship of:

$$f_1+f_2=f_3+f_4.$$

6. The system of claim 5, comprising an on-chip integrated system comprising the mirrorless oscillator.

7. The system of claim 6, wherein the waveguide comprises a silicon nonlinear waveguide between one and five centimeters in length.

* * * * *